(12) United States Patent
Yasumura et al.

(10) Patent No.: US 7,786,225 B2
(45) Date of Patent: Aug. 31, 2010

(54) CURABLE RESIN COMPOSITION

(75) Inventors: Takashi Yasumura, Osaka (JP);
Takashi Tomiyama, Osaka (JP);
Tetsuya Harada, Osaka (JP)

(73) Assignee: DIC Corporation, Tokyo (JP)

( * ) Notice: Subject to any disclaimer, the term of this patent is extended or adjusted under 35 U.S.C. 154(b) by 233 days.

(21) Appl. No.: 10/554,497

(22) PCT Filed: Apr. 30, 2004

(86) PCT No.: PCT/JP2004/006302

§ 371 (c)(1),
(2), (4) Date: Oct. 26, 2005

(87) PCT Pub. No.: WO2004/096878

PCT Pub. Date: Nov. 11, 2004

(65) Prior Publication Data

US 2006/0270810 A1    Nov. 30, 2006

(30) Foreign Application Priority Data

Apr. 30, 2003   (JP) .............................. 2003-125092

(51) Int. Cl.
*C08F 283/10*   (2006.01)
(52) U.S. Cl. ...................................... 525/530; 525/529
(58) Field of Classification Search ................ 525/529, 525/530
See application file for complete search history.

(56) References Cited

U.S. PATENT DOCUMENTS

| | | | |
|---|---|---|---|
| 3,676,398 A | 7/1972 | D'Alelio | |
| 3,770,602 A | 11/1973 | D'Alelio | |
| 5,009,982 A * | 4/1991 | Kamayachi et al. | 430/280.1 |
| 5,024,785 A * | 6/1991 | Hefner et al. | 252/299.01 |
| 5,849,857 A * | 12/1998 | Awaji et al. | 528/98 |
| 6,251,308 B1 | 6/2001 | Butler | |
| 6,515,166 B1 | 2/2003 | Grundke et al. | |
| 2004/0024124 A1 * | 2/2004 | Imaizumi et al. | 525/88 |
| 2006/0135705 A1 * | 6/2006 | Vallance et al. | 525/391 |

FOREIGN PATENT DOCUMENTS

| | | |
|---|---|---|
| JP | 49-100193 | 9/1974 |
| JP | 55-12043 | 3/1980 |
| JP | 1-161069 | 6/1989 |
| JP | 7-252349 | 10/1995 |
| JP | 2908477 | 4/1999 |
| JP | 2001-64340 | 3/2001 |
| JP | 2003-524862 | 8/2003 |
| WO | WO 00/57506 A1 | 9/2000 |

\* cited by examiner

*Primary Examiner*—Mark Eashoo
*Assistant Examiner*—Megan McCulley
(74) *Attorney, Agent, or Firm*—Edwards Angell Palmer & Dodge LLP

(57) ABSTRACT

A curable resin composition, which is a solid resin at ordinary temperatures obtained by reacting an epoxy resin with a (meth)acrylic anhydride, contains an unsaturated resin having a (meth)acryloyl group (A) which has a double bond equivalent weight of 200 to 500, an ester number of 100 to 300, and a hydroxyl number of no more than 130, an ethylenically unsaturated monomer (B), and a radical polymerization initiator (C).

11 Claims, No Drawings

US 7,786,225 B2

CURABLE RESIN COMPOSITION

TECHNICAL FIELD

The present invention relates to a curable resin composition used in a molding material, and a curable resin composition used in the production of a fuel cell separator. More specifically, the present invention relates to a curable resin composition that exhibits excellent flowability during molding, a superior external appearance for the molded product, and excellent levels of hot water resistance and water absorption resistance, as well as a fuel cell separator that uses such a composition.

Priority is claimed on Japanese Patent Application No. 2003-125092, filed Apr. 30, 2003, the content of which is incorporated herein by reference.

BACKGROUND ART

Many different unsaturated resins can be used in radical-curing molding materials, and examples include unsaturated polyester resins, epoxy (meth)acrylate resins (also referred to as vinyl ester resins), urethane (meth)acrylate resins, allyl ester resins, and (meth)acrylate ester oligomers. Depending on the intended application, a variety of different properties may be required of these unsaturated resins. In the case of molding materials used in bathtubs, boats or ships, vehicles, engineering and construction, and electronic components and the like, exposure to particularly severe environments can be expected, meaning a high level of performance is required. In order to achieve a molded product with excellent physical properties, water resistance, and corrosion resistance, epoxy (meth)acrylate resins can be used favorably for the applications described above.

Because an epoxy (meth)acrylate resin generally contains a large number of intramolecular hydroxyl groups generated by the reaction between an epoxy resin and (meth)acrylic acid, a molded product produced by curing such a resin typically exhibits a high coefficient of water absorption, and as a result, the water resistance and heat resistance tend to deteriorate with use. A molding material in which a polyisocyanate compound and a hydroxy compound are added, in specific proportions, to an epoxy (meth)acrylate resin is known to improve on this problem (see Japanese Patent (Granted) Publication No. 2,908,477).

Known methods of improving the hydrophilicity of the epoxy (meth)acrylate resins described above include the use of a photocurable resin composition for a coating material, which contains a liquid reaction product mixture obtained by reacting an epoxy resin, a (meth)acrylic acid anhydride, and (meth)acrylic acid, and also contains a photopolymerizable monomer and a photopolymerization initiator (see Japanese Examined Patent Application, Second Publication No. Sho 55-12043).

In addition, an example of a known vinyl ester resin (epoxy acrylate resin) that uses a similar technique is a liquid epoxy (meth)acrylate resin with a double bond equivalent weight of 170 to 200 for use as a coating material or an adhesive, produced by reacting an epoxy resin with a (meth)acrylic anhydride (quantity used: 0.9 to 1.0 mols per 1.0 mols of epoxy groups) (see U.S. Pat. No. 6,515,166).

Furthermore, curable resin compositions containing a resin such as a vinyl ester resin or unsaturated polyester resin, together with a carbon-based filler and a polyisocyanate have already been proposed as separators for fuel cells (see U.S. Pat. No. 6,251,308).

An unsaturated resin such as an epoxy (meth)acrylate resin or vinyl ester resin, obtained by reacting a (meth)acrylic anhydride with an epoxy resin, which is able to satisfy, to a high level, all of the aforementioned performance requirements such as handling properties, moldability that enables the filling of molding dies with complex shapes, and favorable molded product characteristics such as mechanical strength, corrosion resistance, and long term durability such as resistance to hot water, is as yet unknown. In addition, the use of an unsaturated resin for producing a fuel cell separator molded product that combines excellent conductivity and gas impermeability with excellent durability such as corrosion resistance, has also not yet been proposed.

An object of the present invention is to provide a curable resin composition for a molding material, which enables the production of a molded product such as the various electrical or electronic members which retains the favorable strength characteristics of an unsaturated resin in which (meth)acryloyl groups have been introduced into an epoxy resin (hereafter referred to as an epoxy (meth)acrylate resin), suffers no moldability problems such as the separation between the resin composition and any fillers during molding, or the occurrence of voids or warping, exhibits excellent filling characteristics for molding dies, exhibits excellent flowability and molded product external appearance during molding of the molded product, and also exhibits superior resistance to water absorption and superior hot water resistance, as well as to provide a fuel cell separator that uses such a curable resin composition, and exhibits excellent moldability, dimensional precision, conductivity, heat resistance, mechanical strength, and durability such as hot water resistance.

DISCLOSURE OF INVENTION

As a result of intensive research aimed at achieving the above object, the inventors of the present invention discovered that by using a curable resin composition obtained by reacting an epoxy resin and a (meth)acrylic anhydride as a molding material, wherein the composition contains an unsaturated resin having a (meth)acryloyl group (A), which has a specific hydroxyl number, ester number, and double bond equivalent weight, an ethylenically unsaturated monomer (B), and a radical polymerization initiator (C), a molded product with excellent flowability during molding, superior molded product external appearance, and excellent hot water resistance and heat resistance could be obtained, and they were thus able to complete the present invention.

In other words, a curable resin composition of the present invention is a resin that is solid at ordinary temperatures, is obtained by reacting an epoxy resin with a (meth)acrylic anhydride, and contains an unsaturated resin having a (meth)acryloyl group (A) which has a double bond equivalent weight of 200 to 500, an ester number of 100 to 300, and a hydroxyl number of no more than 130, an ethylenically unsaturated monomer (B), and a radical polymerization initiator (C).

Furthermore, the present invention also provides a curable resin composition used for molding a fuel cell separator that includes a conductive carbon material and a polyisocyanate compound.

When used as a molding material, a curable resin composition of the present invention exhibits excellent flowability during molding and excellent handling properties, suffers no moldability problems during molding such as the occurrence of filling inconsistencies, voids, warping, or cracking, and enables the provision of a molded product with excellent transferability from the molding die, and superior dimensional precision.

Furthermore, a molded product obtained by curing a curable resin composition according to the present invention exhibits excellent external appearance, and excellent levels of water absorption resistance, hot water resistance, and mechanical strength, as well as particularly superior durability such as water resistance. Accordingly, a molded product obtained by curing a curable resin composition of the present invention is extremely useful, not only for household equipment members, but also for electronic and electrical members, vehicle members, and fuel cell separators used under severe conditions. By using a curable resin composition of the present invention, industrial members such as fuel cell separators and the like with excellent properties can be produced economically and stably, using a simple process.

In addition, by using a fuel cell separator of the present invention, a fuel cell having high performance and high durability can be provided at low cost.

BEST MODE FOR CARRYING OUT THE INVENTION

An unsaturated resin having a (meth)acryloyl group (A) that is used in the present invention is a resin that is solid at ordinary temperatures, which is obtained by reacting an epoxy resin with a (meth)acrylic anhydride, and has a double bond equivalent weight of 200 to 500, an ester number of 100 to 300, and a hydroxyl number of no more than 130.

The unsaturated resin (A) comprises a plurality of hydroxyl groups and (meth)acryloyl groups within each molecule arising from ring-opening addition reactions of epoxy groups. The total number of hydroxyl groups and (meth)acryloyl groups is preferably at least 4. The number of (meth)acryloyl groups is preferably 3 or greater.

The number average molecular weight of the unsaturated resin (A) is typically within a range from 900 to 10,000, and preferably from 900 to 5,000, and even more preferably from 1,000 to 3,000. Provided the number average molecular weight falls within the range from 900 to 10,000, favorable levels of strength, water resistance, and handling are obtained. This number average molecular weight refers to a polystyrene-equivalent value determined by GPC measurement.

The hydroxyl number of the unsaturated resin (A) must be no more than 130, and is preferably from 20 to 130, and even more preferably from 30 to 100. By adjusting the hydroxyl number to no more than 130, a favorable hot water resistance, and favorable levels of handling, flowability during molding, and molded product external appearance can be obtained on production of a molded product. Furthermore, by setting the hydroxyl number to a value from 20 to 130, a viscosity suitable for molding can be obtained via a chain elongation reaction by using a thickener (E) such as a polyisocyanate, thus enabling the production of a high quality molded product with minimal defects such as voids occurring during the molding process.

This hydroxyl number describes the number of milligrams of potassium hydroxide (mgKOH/g) required to neutralize the acetic acid produced when a 1 g resin sample is reacted with an acetylation agent at a prescribed temperature and for a prescribed time, in accordance with the method prescribed in JIS K-0070.

One example of a method for controlling the hydroxyl number of the unsaturated resin (A) within a range from 20 to 130 involves calculating the theoretical hydroxyl number for the case where 1 mol of (meth)acrylic acid reacts with 1 mol of epoxy groups within the epoxy resin being used, and then using this number as a standard, calculating the quantity of (meth)acrylic anhydride that should be used to achieve the targeted hydroxyl number. Based on this result, the actual molar ratio of the reactants can be determined. In those cases where the epoxy resin itself has hydroxyl groups, this quantity can be added during the calculation to enable the required quantity of (meth)acrylic anhydride to be determined.

Furthermore, a polyisocyanate that exhibits reactivity relative to the hydroxyl groups within the unsaturated resin (A) may also be used, and the hydroxyl number adjusted to a value within the above range by adding the polyisocyanate after the ring-opening addition reaction.

In order to lower the coefficient of water absorption for the cured product, the ester number of the unsaturated resin (A) must be within a range from 100 to 300, and is preferably from 100 to 280. If the ester number exceeds 300, then obtaining a balance between favorable hot water resistance, and favorable strength properties and curability becomes difficult. If the ester number is lower than 100, then the reactivity falls, making curing much slower, and making the composition unsuitable for use as a molding material.

The ester number describes the number produced by subtracting the acid number from the number of milligrams of potassium hydroxide required (the saponification number) when a 1 g resin sample is subjected to a saponification reaction using potassium hydroxide at a prescribed temperature and for a prescribed time, in accordance with the method prescribed in JIS K-0070.

In addition, in the unsaturated resin (A) described above, the sum of the aforementioned hydroxyl number and the ester number is preferably within a range from 120 to 320, and even more preferably from 150 to 320. If this sum exceeds 320, then the hot water resistance tends to deteriorate unfavorably over time, whereas if the sum is lower than 120, then the reactivity falls, and the curability when used as a molding material is slow, making the resin undesirable from a handling viewpoint.

The double bond equivalent weight of the above unsaturated resin (A) must fall within a range from 200 to 500, and is preferably from 210 to 400. If the double bond equivalent weight falls outside of this range, then curability problems arise when the resin is used as a molding material, and the hot water resistance deteriorates. This double bond equivalent weight is the molecular weight of the unsaturated resin per 1 mol of double bonds, and is calculated by dividing the weight of the unsaturated resin by the number of mols of unsaturated groups incorporated within a unit of weight of the unsaturated resin. The unsaturated groups within the unsaturated resin (A) refers to the (meth)acryloyl groups, and the number of mols of (meth)acryloyl groups within the resin can be measured by NMR analysis of the unsaturated resin (A).

In the unsaturated resin (A), particular emphasis must be placed on the selection of a specific epoxy resin, and the balance between the hydroxyl number and the ester number within the unsaturated resin (A). In addition, by ensuring that, as an indicator of the reactivity of the unsaturated resin (A), the double bond equivalent weight falls within the above range, a favorable balance can be achieved between properties such as flowability during molding, external appearance of the molded product, and hot water resistance (strength retention, resistance to weight reduction) in those cases where the resin is used as a molding material. If the double bond equivalent weight is lower than 200, then a molding material and molded product with excellent hot water resistance cannot be provided by increasing the ester number of the unsaturated resin (A) in the manner described above.

Epoxy resins that can be used as the raw material for the unsaturated resin (A) preferably have an epoxy equivalent weight of at least 200, and preferably from 220 to 800, and even more preferably from 220 to 500. Resins with epoxy equivalent weights outside this range tend to be inferior in terms of hot water resistance, flowability during molding, or the external appearance of the molded product. This epoxy equivalent weight must be at least 200 in order to enable the unsaturated resin (A) to be adjusted to a specific hydroxyl number and a specific ester number. Furthermore, in those cases where two or more epoxy resins are combined as raw materials, the sum of the values generated by multiplying the blend ratio by the epoxy equivalent weight for each of the resins is used as the epoxy equivalent value for the mixed epoxy resin, and this value is preferably 200 or greater.

The above epoxy resin preferably includes an aromatic ring-based structure and/or an aliphatic ring-based structure, and suitable resins include glycidyl ethers of multinuclear phenols such as bisphenol A epoxy resins, biphenol epoxy resins, phenol novolac epoxy resins, cresol novolac epoxy resins, and brominated epoxy resins, glycidyl ethers of polyols such as diglycidyl ethers of alkylene oxide adducts of bisphenol A and diglycidyl ethers of hydrogenated bisphenol A, glycidyl esters such as diglycidyl hexahydrophthalate, glycidyl amines such as tetraglycidyldiaminodiphenylmethane, as well as bisphenol fluorene epoxy resins and biscresol fluorene epoxy resins. These epoxy resins can be used either alone, or in combinations of two or more different resins.

Of these, the use of novolac epoxy resins is preferred in terms of hot water resistance and water resistance. Moreover, the use of dicyclopentadiene-based novolac epoxy resins and biphenyl-based novolac epoxy resins is particularly desirable.

Examples of dicyclopentadiene-based novolac epoxy resins include resins obtained by reacting dicyclopentadiene and a phenol in the presence of an acid catalyst, and then stirring the reaction product with activated white clay within an organic solvent (see Japanese Unexamined Patent Application, First Publication No. Hei 7-252349). Furthermore, examples of biphenyl-based novolac epoxy resins include the resins obtained by glycidyl etherification of the phenolic hydroxyl groups of a 4,4'-biphenyldiylmethylene-phenol resin (see Japanese Unexamined Patent Application, First Publication No. 2001-64340).

The epoxy resin preferably contains from 30 to 90% by mass, and even more preferably from 50 to 80% by mass, of aromatic ring-based structural units and/or aliphatic ring-based structural units within the molecule. By using an epoxy resin that contains from 30 to 90% by mass of aromatic ring-based structural units and/or aliphatic ring-based structural units, the molded product produced from the thus obtained molding material exhibits low water absorption, and high levels of strength and durability.

Furthermore, in terms of the curability and hot water resistance of the obtained unsaturated resin (A), the number of epoxy groups within each molecule of the epoxy resin must be an average of 2.0 groups or greater. In order to further improve the hot water resistance, an average value of 2.5 groups or more is preferred, and the use of epoxy resins with an average of 3 to 5 epoxy groups is particularly desirable.

The (meth)acrylic anhydride used as a raw material for the unsaturated resin (A) can also use a mixture of (meth)acrylic anhydride and (meth)acrylic acid.

In such cases, the relative proportions of the (meth)acrylic anhydride and the (meth)acrylic acid, although varying depending on the target hydroxyl number for the unsaturated resin (A), are preferably set so that the molar ratio between the (meth)acrylic anhydride and the (meth)acrylic acid is within a range from 100/0 to 10/90. Ratios from 100/0 to 50/50 are even more desirable. The (meth)acrylic anhydride and (meth) acrylic acid can use commercially available products that have been produced industrially. The purity of the (meth) acrylic anhydride is preferably 95% by mass or higher. Although dependent on the method of production, in those cases where the (meth)acrylic anhydride contains only (meth) acrylic acid as an impurity, the actual blend ratio of the (meth)acrylic anhydride and (meth)acrylic acid can be controlled so as to obtain the desired unsaturated resin (A).

An example of the reaction method and reaction conditions for producing the unsaturated resin (A) involves charging a reaction vessel with the aforementioned epoxy resin, raising the temperature to approximately 90° C., and then conducting a reaction under a mixed stream of nitrogen and dry air, with constant stirring, by adding (meth)acrylic anhydride dropwise while paying particular attention to the level of exotherm. Once the heat generation has subsided, the reaction is continued, preferably with the temperature maintained at 90 to 120° C., until the targeted acid number is obtained, thereby yielding the unsaturated resin (A). If required, reduced pressure treatment may be used in the latter stages of the reaction to remove any excess (meth)acrylic acid and the like. The reaction method for those cases where a combination of (meth)acrylic anhydride and (meth)acrylic acid is used may involve either a batch reaction or a segmented reaction. From the viewpoint of the ease with which the reaction can be scaled up to industrial production a segmented reaction is preferred, and a particularly desirable method involves charging a reaction vessel with the aforementioned epoxy resin and (meth)acrylic acid, raising the temperature to approximately 90° C., reacting the (meth)acrylic acid first under a mixed stream of nitrogen and dry air, with constant stirring, until an acid number of 0 to 10 is obtained, and subsequently adding the (meth)acrylic anhydride dropwise to continue the reaction. The target acid number in this case is from 1 to 10. The end point of the resin production is usually set at an acid number of no more than 10, and preferably 5 or less.

In the above reaction, a catalyst that accelerates the reaction is preferably added in a quantity equivalent to 0.1 to 2.0% by mass relative to the combined weight of the epoxy resin and the (meth)acrylic anhydride [which may include (meth) acrylic acid]. Examples of suitable catalysts include tertiary amine compound such as triethylamine and benzylamine, organic phosphorus-based compounds such as triphenylphosphine, and quaternary ammonium salts such as benzyltrimethylammonium chloride. In addition, in order to prevent abnormal reactions including gelling, the reaction is preferably conducted with air being blown through the system. The addition of 0.01 to 1.0% by mass of a polymerization inhibitor is also desirable. Examples of suitable polymerization inhibitors include quinones such as hydroquinone and t-butylhydroquinone, and if necessary, other compounds such as phenothiazine or the various antioxidants may also be added.

The unsaturated resin (A) preferably contains from 20 to 80% by mass, and even more preferably from 30 to 60% by mass, of aromatic ring-based structural units and/or aliphatic ring-based structural units. If this proportion falls outside this range, then achieving a balance between curability, strength, and hot water resistance and the like becomes impossible.

There are no particular restrictions on the ethylenically unsaturated monomer (B), provided it is a monomer that is capable of copolymerization with the unsaturated resin (A).

Because the unsaturated resin (A) is either a viscous syrup with no fluidity or a completely solidified solid at ordinary temperatures (25° C.), the ethylenically unsaturated monomer (B) functions as both a diluent and reaction component for the unsaturated resin (A). The viscosity of the unsaturated resin (A) can be measured when dissolved in the ethylenically unsaturated monomer (B), and that viscosity is preferably within a range from 500 to 15,000 mPa·s (at 25° C., in a mixed solution containing 80% by mass of the unsaturated resin (A) and 20% by mass of a styrene monomer);

By diluting the unsaturated resin (A) using this ethylenically unsaturated monomer (B), the handling and moldability properties are improved during production of a molding material, and the heat resistance and water resistance of the resulting molded product can also be improved.

Examples of the ethylenically unsaturated monomer (B) include aromatic vinyl monomers, (meth)acrylates, diallylphthalate esters, vinyl carboxylates, vinyl ethers, and maleimide compounds. Of these, in the case of molded products such as fuel cell separators that require low water absorption and superior heat resistance, aromatic vinyl monomers are preferred.

Specific examples of suitable aromatic vinyl monomers include styrene, t-butylstyrene, vinylnaphthalene, vinylbiphenyl, pentafluorostyrene, vinylpyrene, vinylthiophene, and vinylcarbazole. In order to further improve the water resistance and heat resistance, a divinyl monomer such as divinylbenzene, divinylnaphthalene, or divinylbiphenyl is preferably combined with the above aromatic vinyl monomer. These aromatic vinyl monomers typically have an ester number of 0. Furthermore, other monomers can also be added for the purpose of improving various other performance factors, provided their addition does not impair the moldability, water absorption or heat resistance properties.

Specific examples of suitable (meth)acrylate esters include monofunctional monomers such as dicyclopentenyl methacrylate, dicyclopentenyloxyethyl methacrylate, dicyclopentanyl methacrylate, isobornyl methacrylate, phenoxyethyl methacrylate, and adamantane methacrylate, as well as bifunctional monomers such as 1,9-nonanediol dimethacrylate, 1,10-dodecanediol dimethacrylate, cyclohexanedimethanol dimethacrylate, tricyclodecanedimethanol dimethacrylate, hydrogenated bisphenol A dimethacrylate, and bisphenol A 2-mol propylene oxide adduct dimethacrylate. In addition, trifunctional monomers and tetrafunctional monomers and the like can also be used. In terms of water resistance and heat resistance, bifunctional or higher polyfunctionality is preferred, but if the cross-linking density becomes too high, the molded product can become brittle, meaning considerable caution is required. Of these compounds, compounds with an ester number of no more than 400 are preferred in terms of resistance to water absorption and water resistance. Furthermore, other monomers can also be added for the purpose of improving various other performance factors, provided their addition does not impair the low water absorption or hydrolysis resistance and the like.

The blend ratio between the aforementioned unsaturated resin (A) and the ethylenically unsaturated monomer (B) varies depending on the cross-linked structure and properties required of the cured product formed from the unsaturated resin (A) and the ethylenically unsaturated monomer (B), but in terms of achieving a favorable balance between the moldability and hot water resistance of the molding material, a weight ratio (A)/(B) that falls within a range from 90/10 to 40/60 is preferred. Ratios from 80/20 to 50/50 are even more desirable. Provided the ratio (A)/(B) falls within the above range, the moldability of the molding material of the present invention is suitable, and a cured product and molded product with superior performance in terms of mechanical strength and hot water resistance and the like can be obtained.

There are no particular restrictions on the radical polymerization initiator (C) used in the present invention, provided it is a compound capable of initiating the copolymerization between the aforementioned unsaturated resin (A) and ethylenically unsaturated monomer (B) to effect curing. Suitable examples include one or more materials selected from amongst thermal polymerization initiators, ultraviolet polymerization initiators, and electron beam polymerization initiators and the like. The quantity used of the radical polymerization initiator (C) is preferably within a range from 0.1 to 10 parts by weight, and even more preferably from 1 to 5 parts by weight, per 100 parts by weight of the mixture of the unsaturated resin (A) and the ethylenically unsaturated monomer (B).

Examples of suitable thermal polymerization initiators include organic peroxides such as diacyl peroxide-based compounds, peroxyester-based compounds, hydroperoxide-based compounds, ketone peroxide-based compounds, alkyl perester-based compounds, and percarbonate-based compounds, and of these, the compound that is most suited to the molding conditions can be selected.

Examples of suitable ultraviolet polymerization initiators include photosensitizing materials such as acylphosphine oxide-based compounds, benzoin ether-based compounds, benzophenone-based compounds, acetophenone-based compounds, and thioxanthone-based compounds. Of these, the compound that is most suited to the molding conditions can be selected and used. Furthermore, examples of suitable electron beam polymerization initiators include halogenated alkylbenzenes and disulfide-based compounds.

In order to accelerate the curing, a radical polymerization accelerator, that is a curing accelerator, can also be used in combination with the radical polymerization initiator (C). Examples of suitable curing accelerators include metal salts such as cobalt naphthenate and cobalt octenoate, and tertiary amines such as N,N-dimethylaniline, N,N-di(hydroxyethyl) para-toluidine, and dimethylacetoacetamide, and these can be selected and used as required.

Examples of the reinforcing material and/or filler (D) used in the present invention include both conductive materials and non-conductive materials, and an appropriate material may be selected and used in accordance with the intended application.

Examples of conductive materials used in the present invention include carbon materials, metals, metal compounds, and conductive polymer powders, and of these, from the viewpoints of durability and corrosion resistance, carbon-based materials are preferred. Examples of suitable carbon-based materials include artificial graphite, natural graphite, glass-like carbon, carbon black, acetylene black, ketchen black, and expanded graphite produced by chemical treatment of graphite. Fibrous carbon fiber can also be used. In the case of the production of a fuel cell separator, artificial graphite is preferred. The calcination temperature of the graphite is typically 2,500° C. or higher, and preferably 2,700° C. or higher, and even more preferably 2,900° C. or higher, the average particle size is typically within a range from 1 to 500 μm, and preferably from 50 to 350 μm, and the aspect ratio is preferably no more than 3.5.

Of the above materials, examples of fibrous carbon materials include pitch-based, PAN-based, and rayon-based carbon fiber, which differ in accordance with the raw material fiber. There are no particular restrictions on the length or shape of the carbon fibers, although in order to achieve a bulk molding compound (hereafter referred to as BMC), and considering the mixing characteristics with the resin, the fiber length is typically no longer than 25 mm, and preferably within a range from 1 μm to 10 mm. Specific examples of carbon fibers of this type of length include filament fibers, chopped strands, milled fibers, and carbon nanotubes.

Examples of the metals and metal compounds mentioned above include aluminum, zinc, iron, copper, nickel, silver, gold, stainless steel, palladium, and titanium, as well as the borides of these metals, zirconium boride, hafnium boride, tin-antimony oxide, indium-tin oxide, indium-zinc oxide, indium oxide, and zinc-aluminum oxide. Suitable forms for these metals and metal compound include particles, fibers, foils, or amorphous forms.

Examples of suitable non-conductive materials include calcium carbonate, magnesium carbonate, mica, talc, kaolin, clay, celite, asbestos, perlite, barite, silica, quartz sand, silicon carbide, boron nitride, dolomite, hollow balloons, alumina, glass powder, glass fiber, aluminum hydroxide, calcite, zirconium oxide, antimony trioxide, titanium oxide, molybdenum dioxide, and aramid fiber.

These materials can be selected appropriately with due consideration to factors such as workability, and the strength, external appearance, and required performance characteristics of the molded product. Typically, calcium carbonate, aluminum hydroxide, silica, talc, alumina, glass fiber, carbon fiber, and aramid fiber are the most commonly used. Suitable fillers also include the materials generated by subjecting the fillers above to surface treatment.

The quantity used of the reinforcing material and/or filler (D) is typically within a range from 1 to 90% by mass of the resin composition made up of the aforementioned components (A), (B), (C), and (D). Although dependent on the target application and the required performance characteristics, quantities within a range from 10 to 80% by mass are usually preferred. In the case of the production of a highly conductive fuel cell separator, a conductive carbon-based material in a quantity within a range from 60 to 85% by mass is preferred as the component (D). If the quantity is less than this range, the conductivity is insufficient, whereas if the quantity is too large, the strength and water resistance of the molded product tend to decrease unfavorably.

A curable resin composition of the present invention, when used as a radical curing molding material, preferably also contains a thickener (E) in order to improve the handling characteristics of the molding material described above, and reduce the occurrence of molding defects upon compression molding.

The thickener (E) may be any organic or inorganic compound that exhibits a thickening effect. These compounds can be selected and used in accordance with the intended application.

Examples of suitable organic compounds that can be used in the present invention include polyisocyanate compounds, polycarbodiimide compounds, and metal alkoxy compounds. Of these, polyisocyanate compounds are preferred as they are able to cause thickening through reaction with the hydroxyl groups of the aforementioned unsaturated resin (A) under mild conditions between room temperature and approximately 50° C. In addition, acrylic resin-based fine particles are also desirable as they allow thickening to be achieved easily by heating. Examples of commercially available acrylic resin-based fine particles include the polymethylmethacrylate resin-based product F303 (manufactured by Zeon Corporation).

Examples of suitable inorganic compounds include metal oxides such as finely powdered silica and magnesium oxide. In those cases where thickening is conducted using magnesium oxide, the curable molding material preferably includes a polymer compound that contains acid groups. Polymers such as copolymers of styrene and (meth)acrylic acid are preferred in terms of the water resistance.

The quantity used of the above thickener (E) varies depending on the compound used. For example, in those cases where a polyisocyanate compound is used as the thickener, the use of a quantity of polyisocyanate that results in a OH/NCO ratio of 1/0.8 to 1/1.2 relative to the hydroxyl groups of the unsaturated resin (A) is preferred in terms of the hot water resistance. Furthermore, by controlling this quantity, the moldability of the molding material and the properties of the molded product can be controlled.

Specific examples of the above polyisocyanate compound include 1,6-hexamethylene diisocyanate, trimethylhexamethylene diisocyanate, 4,4'-diphenylmethane diisocyanate, tolylene diisocyanate, xylylene diisocyanate, naphthalene diisocyanate, 1,4-cyclohexane diisocyanate, 4,4'-dicyclohexylmethane diisocyanate, isophorone diisocyanate, hydrogenated xylylene diisocyanate, and norbornene diisocyanate. Furthermore, the isocyanurate compounds obtained by isocyanuration of each of the above isocyanate compounds can also be used. These compounds can be used either alone, or in combinations of two or more different compounds.

In those cases where acrylic resin-based fine particles are used as the thickener (E), the quantity used is preferably within a range from 10 to 50 parts by weight per 100 parts by weight of the mixture of the aforementioned unsaturated resin (A) and ethylenically unsaturated monomer (B). In those cases where a metal oxide is used as the thickener, the optimum quantity is determined in accordance with the nature and molecular weight of the compound that contains the acid groups.

Where required, the curable resin composition of the present invention may also include low profile additives, polymerization inhibitors, internal mold release agents, compatibilizing-agent, as well as other additives and colorants.

Examples of other additives that can be used include silane-based or titanate-based coupling agents, flame retardants, ultraviolet stabilizers, antioxidants, antistatic agents, hydrophilicity imparting agents, antibacterial agents, water repellents, antifoaming agents, and air blocking agents.

A curable resin composition of the present invention can be used in the production of molded products, for example as a sheet molding compound (hereafter referred to as SMC) or a bulk molding compound (hereafter referred to as BMC) for use as a press molding material, injection molding material, hand lay-up molding material, cast molding material, draw molding material, or lining material.

The molded product can be obtained from a molding material that uses an aforementioned curable resin composition, using any of the various molding methods.

Examples of suitable molding methods include hand lay-up molding, compression molding, transfer molding, injection molding, draw molding, and rotational molding. Factors such as the shape of the molded product are selected appropriately in accordance with the intended application.

Examples of suitable molded products include household equipment such as bathtubs, kitchen counters, bathroom vanities, and imitation marble, civil engineering and construction materials such as drawn materials and polymer concrete, industrial members such as the blades for wind power generators, vehicle components such as lamp reflectors and carbon fiber composites for automobiles, as well as electrical equipment components and electronic components such as motor sealants, diode sealants, breaker boxes, electrical substrates, and fuel cell separators.

In a method of producing an aforementioned molding material, the unsaturated resin (A), the ethylenically unsaturated monomer (B), the radical polymerization initiator (C), and where required the reinforcing material and/or filler (D) are combined, either in a single batch or in steps, and are then mixed together using a mixing device. The mixing can be conducted using a mixing device such as a kneader, stirrer, or mixer or the like. The mixing may be conducted either at normal pressures, or under reduced pressure. Furthermore, the temperature during mixing is preferably within a range from room temperature to 60° C.

In order to improve the moldability and the handling properties of the mixture, the mixture can be converted to a sheet, block, or particles.

In those cases where a thickening step is required for the molding material, the mixture may be held at a temperature within a range from room temperature to 80° C. following mixing, to allow the thickening to proceed. The time required for this step varies depending on factors such as the composition of the resin, the kind and quantity of any thickener used, and the temperature conditions, but is typically within a range from 1 to 100 hours.

Even in those cases where a polyisocyanate is used as the thickener (E), a molding material of the present invention retains favorable moldability and handling properties over an extended period. This is an effect of having tightly controlled the hydroxyl number, ester number, the sum thereof, and the double bond equivalent weight of the unsaturated resin (A).

Particularly in those cases where a fuel cell separator is produced from the molding material, a molding die with a channel that corresponds with the shape of the separator can be used, and molding can be conducted using a molding method such as compression molding or injection molding. In such cases, the molding temperature is preferably within a range from approximately 100 to 200° C. This temperature is preferably matched to the optimum temperature band for the thermal polymerization initiator that has been used. In terms of productivity, the temperature is preferably within a range from 140 to 190° C. The molding pressure can be adjusted to the most suitable pressure in accordance with factors such as the molding die used, the shape of the molded product, and the intended application for the product.

This pressure is typically within a range from 5 to 20 MPa. If required, post-curing can be conducted in a heated atmosphere following the molding, to promote further curing or correction.

The heat resistance of the molded product can be evaluated by measuring the heat distortion temperature in accordance with the method prescribed in JIS-K-7207 (the edgewise method of ISO-75). The heat distortion temperature of the molded product is the value determined under measurement conditions that include a load of 181.3 N/cm$^2$, and is preferably at least 150° C., and even more preferably 200° C. or higher. Particularly in those cases where the molded product is used as a fuel cell separator, a high heat resistance is preferred as it reduces the possibility of thermal distortion after mounting.

Using conventional resin molding methods, the above molding material can be molded with precise channels that can act as gas channels, without requiring any cutting processes or the like, and consequently, the molding material is ideal for the production of precision molded components such as fuel cell separators. Furthermore, molding materials of the present invention are also useful as putty, sealing materials, adhesives, and dental materials.

A fuel cell separator obtained using a curable resin composition of the present invention is preferably used within a fuel cell for which the operating temperature is no higher than 200° C. This type of fuel cell separator can be used as the separator in a variety of different fuel cells, including hydrazine fuel cells, direct methanol fuel cells, alkali fuel cells, solid polymer fuel cells, and phosphate fuel cells. Of these, the separator is particularly suited to solid polymer fuel cells.

EXAMPLES

As follows is a description of specifics of the present invention, based on a series of examples and comparative examples. In the following description, unless stated otherwise, the units "parts" and "%" all refer to mass-referenced values.

Synthesis Example 1

Production of an Unsaturated Resin (A-1)

A 1 L flask fitted with a thermometer, a nitrogen and air inlet, and a stirrer was charged with 470 g of an epoxy resin [product name: Epiclon 1055, manufactured by Dainippon Ink and Chemicals, Incorporated, a bisphenol A epoxy resin with an epoxy equivalent weight of 470], 154 g of (meth) acrylic anhydride [product name: MAAH, manufactured by Rohm Ltd.], and 0.2 g of t-butylhydroquinone, and the temperature of the mixture was then raised to 90° C. under a stream of a mixed gas containing a 1:1 ratio of nitrogen and air. To this mixture was added 1.2 g of tris-dimethylaminophenol, and when the temperature was then raised to 110° C. and reaction was conducted for 8 hours, the acid number fell below 3, and so the reaction was halted. Following cooling to a temperature of approximately 80° C., the product was removed from the reaction vessel, thus yielding the targeted unsaturated resin. This resin is referred to below as the resin A-1. The resin A-1 had a hydroxyl number of 82, an ester number of 178, a double bond equivalent weight of 312, a resin viscosity (in a solution containing 20% of a styrene monomer diluent) of 11,000 mPa·s, an aromatic ring structural unit content of 51%, and a number average molecular weight of 2,100.

Synthesis Example 2

Production of an Unsaturated Resin (A-2)

A similar 1 L four neck flask to that used in the synthesis example 1 was charged with 552 g of an epoxy resin [product name: NC-3000, manufactured by Nippon Kayaku Co., Ltd., a biphenyl group-containing phenol novolac epoxy resin with an epoxy equivalent weight of 276], 86 g of methacrylic acid, 154 g of (meth)acrylic anhydride [product name: MAAH, manufactured by Rohm Ltd.], and 0.25 g of t-butylhydroquinone, and the temperature of the mixture was then raised to 90° C. under a stream of a mixed gas containing a 1:1 ratio of nitrogen and air. To this mixture was added 1.0 g of tris-dimethylaminophenol, and when the temperature was then raised to 110° C. and reaction was conducted for 6 hours, the acid number fell below 3, and so the reaction was halted. Following cooling to a temperature of approximately 80° C., the product was removed from the reaction vessel, thus yielding the targeted unsaturated resin. This resin is referred to below as the resin A-2. The resin A-2 had a hydroxyl number of 75, an ester number of 212, a double bond equivalent weight of 263, a resin viscosity (in a solution containing 20% of a styrene monomer diluent) of 5,100 mPa·s, an aromatic ring structural unit content of 45%, and a number average molecular weight of 1,400.

Comparative Synthesis Example 1

Production of a Comparative Unsaturated Resin (V-1)

A similar flask to that used in the synthesis example 1 was charged with 380 g of an epoxy resin [product name: Epiclon 850, manufactured by Dainippon Ink and Chemicals, Incorporated, a bisphenol A epoxy resin with an epoxy equivalent weight of 190], 169 g of methacrylic acid, and 0.16 g of t-butylhydroquinone, and the temperature of the mixture was then raised to 90° C. under a stream of a mixed gas containing a 1:1 ratio of nitrogen and air. To this mixture was added 1.1 g of tris-dimethylaminophenol, and when the temperature was then raised to 110° C. and reaction was conducted for 10 hours, the acid number fell below 4, and so the reaction was halted. Following cooling to a temperature of approximately 80° C., the product was removed from the reaction vessel, thus yielding an unsaturated resin. This resin is referred to below as the unsaturated resin V-1. The resin V-1 had a hydroxyl number of 198, an ester number of 196, a double bond equivalent weight of 283, a resin viscosity (in a solution containing 20% of a styrene monomer diluent) of 1,780 mPa·s, an aromatic ring structural unit content of 30%, and a number average molecular weight of 810.

Example 1

70 parts of the unsaturated resin A-1 obtained in the synthesis example 1, and 30 parts of styrene were placed in a glass bottle, and stirred and mixed while heating at 50° C. Following cooling to room temperature, 2 parts of benzoyl peroxide was added, yielding a resin mixed liquid. The hydroxyl number of the overall resin liquid was 57. Using the thus obtained resin mixed liquid, a molding material was prepared.

A glass chopped strand mat was prepared as a filler. A glass mat with a unit weight of 450 g/m² [product name: MC450A, manufactured by Nitto Boseki Co., Ltd.] was cut into sheets with dimensions of 20×20 (cm), and three such sheets were prepared.

Using a 30 cm square glass plate as a substrate, a polyethylene terephthalate sheet (hereafter referred to as a PET sheet) of thickness 38 μm that had been silicon release-treated on one surface was fixed to the top of the substrate. Subsequently, the aforementioned three cut glass mats (weight: 54 g) were placed on top of the PET sheet, and the above resin mixed liquid (weight: 200 g) was impregnated thoroughly into the glass mats using a metal roller. Finally, a PET sheet similar to that described above was placed on top. To prevent liquid leakage, the periphery of the structure was then wrapped and sealed with tape, thus yielding a molding material. This molding material is referred to as sheet 1.

Example 2

With the exception of replacing the unsaturated resin A-1 with the unsaturated resin A-2, operations were conducted in the same manner as the example 1, yielding a resin mixed liquid. The hydroxyl number of the overall resin liquid was 52. A molding material was then prepared in the same manner as the example 1. This molding material is referred to as sheet 2.

Comparative Example 1

With the exception of replacing the unsaturated resin A-1 with V-1, operations were conducted in the same manner as the example 1, yielding a resin mixed liquid. The hydroxyl number of the overall resin liquid was 138. A molding material was then prepared in the same manner as the example 1. This molding material is referred to as sheet 3.

[Evaluation Tests]

The sheet 1, sheet 2, and sheet 3, obtained in the examples 1 and 2, and the comparative example 1 respectively, were each sandwiched between two aluminum flat plates of thickness 3 mm, and then allowed to stand for 1 hour in a thermostatic chamber at 70° C. The temperature was then raised from 70° C. to 150° C. over a period of approximately 1 hour, and each sheet was held at this raised temperature for a further 2 hours, before being cooled to room temperature. An FRP molded product of thickness 4.5 mm and dimensions of 20 cm×20 cm was obtained.

Each of these FRP molded products was tested for flexural strength, flexural modulus, heat distortion temperature, and boiling water absorption, using the conditions outlined below. The results are shown in Table 1.

Flexural strength and flexural modulus: A strip of dimensions 2.5×10 (cm) was cut from each of the FRP molded products obtained in the above examples and the comparative example, and using this strip as a test specimen, a flexural test was conducted at room temperature, in accordance with JIS-K6911.

Heat distortion temperature: A strip of dimensions 1.27×12 (cm) was cut from each of the FRP molded products obtained in the above examples and the comparative example, and using this strip as a test specimen, a test was conducted in accordance with JIS-K7191. The test conditions involved using an edgewise method with a load of 1.8 MPa.

Boiling water absorption: A sample of dimensions 5×5 (cm) was cut from each of the FRP molded products obtained in the above examples and the comparative example, and using this sample as a test specimen, the specimen was immersed in ion exchange water at 100° C., and the rate of increase in the weight of the sample, relative to the weight prior to immersion, was measured after 1 hour, after 24 hours, after 100 hours, and after 400 hours.

TABLE 1

| | | Examples | | Comparative example |
|---|---|---|---|---|
| Item | | 1 | 2 | 1 |
| Blend quantity (parts) | Unsaturated resin (A) | A-1 70 | A-2 70 | V-1 70 |
| | Hydroxyl number | 82 | 75 | 198 |
| | Ester number | 178 | 212 | 196 |
| | Double bond equivalent weight | 312 | 263 | 283 |
| | Monomer (B) styrene | 30 | 30 | 30 |
| | Polymerization initiator (C) | 0.33 | 0.33 | 0.33 |

TABLE 1-continued

| | | Examples | | Comparative example |
|---|---|---|---|---|
| | Item | 1 | 2 | 1 |
| | 50% benzoyl peroxide Reinforcing material, filler (D) Glass mat | 21 | 21 | 21 |
| Molded product performance | Flexural strength (MPa) | 120 | 115 | 116 |
| | Flexural modulus (MPa) | 6600 | 6500 | 6800 |
| | Heat distortion temperature (° C.) | >300 | >300 | >300 |
| | Boiling water absorption (%) | | | |
| | after 1 hour | 0.16 | 0.12 | 0.28 |
| | after 24 hours | 0.62 | 0.5 | 1.1 |
| | after 100 hours | 0.82 | 0.71 | 1.5 |
| | after 400 hours | 0.91 | 0.83 | 1.8 |

As is evident from the results shown in Table 1, in the examples 1 and 2, the low boiling water absorption values indicate that a high quality molded product with excellent resistance to water absorption has been obtained.

Next, synthesis examples are presented for unsaturated resins (A) that can be used for household equipment members, together with examples of preparing molding materials, evaluation results for these molding materials, as well as synthesis examples for comparative unsaturated resins, examples of preparing molding materials using these comparative unsaturated resins, and evaluation results for these molding materials. The measurement methods and evaluation criteria used within these examples are described below.

[Evaluation of External Appearance of Molded Products]

Using the plate-shaped products obtained in each of the above examples as test specimens, these test specimens were inspected visually in terms of filling characteristics, warping, cracking, blistering, and internal state. For the filling characteristics, samples in which filling had occurred evenly out to the edges were evaluated as "good", whereas samples in which filling was incomplete, or in which the thickness was non-uniform were evaluated as "poor". Warping, cracking, and blistering were reported as either "no" in those cases where absolutely no occurrences were observed on the test specimen, or "yes" if even a minor occurrence was detected. The internal state was evaluated by visually inspecting a cross section of the test specimen, and was evaluated as either "good" if the cross section was dense, or "many voids" if many hollow voids were present.

[Measurement of Flexural Strength of Molded Products]

The plate-shaped products obtained in the examples described below were cut to the prescribed size to prepare test specimens, and the flexural strength was then measured in accordance with JIS K-6911. The atmosphere during measurement was set at 25° C. The test specimens were cut to a width of 2.5 cm and a length of 7 cm.

[Measurement of Heat Distortion Temperature of Molded Products]

The plate-shaped products obtained in the examples described below were cut to the prescribed size to prepare test specimens, and the heat distortion temperature was then measured in accordance with the A method of JIS K-7207. The load during measurement was 181.3 N/cm$^2$.

[Evaluation of Hot Water Resistance of Molded Products (Strength Retention Test Method)]

The plate-shaped products obtained in the examples described below were cut to the prescribed size to prepare test specimens. A 1.5 L pressure vessel (pressure vessel manufactured from SUS316L, product name: TEM-D1000, manufactured by Taiatsu Techno Corporation) was charged with 30 test specimens and 1 L of ion exchange water, and the vessel was then sealed. The vessel was then placed in a 50° C. constant temperature oil bath, and the temperature of the oil bath was raised so that the internal temperature reached 110° C. in approximately 2 hours. Subsequently, the specimens were left immersed in the ion exchange water for 200 hours while the internal temperature was maintained at 110±1° C. Following completion of this predetermined time, the vessel was removed from the oil bath, and allowed to cool gradually for approximately 12 hours at room temperature, and following release of the pressure, the test specimens were removed. The recovered test specimens were left to stand for approximately 48 hours at room temperature, and the flexural strength was then measured in accordance with JIS K-6911. The strength retention rate (%) relative to the strength prior to immersion was calculated, and evaluated using the four stages of criteria listed below. The atmosphere during measurement was set to 25° C.

1: The retention rate (%) relative to the strength prior to immersion was at least 0% but less than 40%.
2: The retention rate (%) relative to the strength prior to immersion was at least 40% but less than 60%.
3: The retention rate (%) relative to the strength prior to immersion was at least 60% but less than 80%.
4: The retention rate (%) relative to the strength prior to immersion was at least 80% but no more than 110%.

[Evaluation of Weight Reduction Ratio for Molded Products]

Test specimens of the same shape as those used for the flexural test were immersed in hot water under the same conditions as those described above, and the test specimens were then allowed to stand for 48 hours at room temperature. The test specimens were then force dried for 48 hours at 90° C., and then allowed to stand for a further 1 hour at room temperature, before the weight was measured. The weight reduction ratio relative to the initial weight was calculated.

In terms of molded product performance, products with low weight reduction ratios are preferred.

[Evaluation of External Appearance of Molded Products Following Hot Water Resistance Testing]

Test specimens of the same shape as those used for the flexural test were immersed in hot water under the same conditions as those described above, and the test specimens were then allowed to stand for 48 hours at room temperature, and then evaluated visually in terms of their external appearance.

In terms of gloss, test specimens with gloss irregularities were evaluated as "poor", while those with no such irregularities were evaluated as "good". In terms of blistering, test specimens with blisters were recorded using "yes", while those with no blistering were recorded using "no". Molded products with no gloss irregularities and no blistering are preferred.

Synthesis Example 3

Production of an Unsaturated Resin (A-3)

A 1 L four neck flask fitted with a nitrogen and air inlet was charged with 296 g of an epoxy resin [product name: Epiclon 850, manufactured by Dainippon Ink and Chemicals, Incorporated, a bisphenol A epoxy resin with an epoxy equivalent weight of 190], and 206 g of another epoxy resin [product name: Epiclon 1050, manufactured by Dainippon Ink and Chemicals, Incorporated, a bisphenol A epoxy resin with an epoxy equivalent weight of 470], and the mixture was stirred while the temperature was raised to 90° C. The epoxy equivalent weight of the mixture at this point was 251. Subsequently, 31 g of methacrylic acid, 0.3 g of t-butylhydroquinone, and 0.8 g of tris-dimethylaminophenol were added at 90° C., and the temperature of the mixture was then raised to 105° C. under a stream of a mixed gas containing a 1:1 ratio of nitrogen and air. Following raising of the temperature to 105° C. and subsequent reaction for 1 hour, the acid number had fallen below 5, and so the temperature was cooled to approximately 100° C., and 246 g of (meth)acrylic anhydride [product name: MAAH, manufactured by Rohm Ltd.] was added dropwise with due care given to heat generation. Subsequently, 0.8 g of tris-dimethylaminophenol was added, and the temperature was raised to 110° C. When the mixture was reacted for 5 hours at 110° C., the acid number fell below 5, and so the reaction was halted. Following cooling to a temperature of approximately 80° C., the product was removed from the reaction vessel, thus yielding an unsaturated resin. This resin is referred to below as the unsaturated resin A-3. The unsaturated resin A-3 had a hydroxyl number of 61, an ester number of 251, a double bond equivalent weight of 238, a resin viscosity (in a solution containing 20% of a styrene monomer diluent) of 1,380 mPa·s, an aromatic ring structural unit content of 30%, and a number average molecular weight of 1,020.

Synthesis Example 4

Production of an Unsaturated Resin (A-4)

A similar flask to that used in the synthesis example 1 was charged with 548 g of an epoxy resin [product name: NC-3000, manufactured by Nippon Kayaku Co., Ltd., a biphenyl group-containing phenol novolac epoxy resin with an epoxy equivalent weight of 274], and the resin was stirred while the temperature was raised to 90° C. Subsequently, 55 g of methacrylic acid, 0.4 g of t-butylhydroquinone, and 0.8 g of tris-dimethylaminophenol were added at 90° C., and the temperature of the mixture was then raised to 105° C. under a stream of a mixed gas containing a 1:1 ratio of nitrogen and air. Following raising of the temperature to 105° C. and subsequent reaction for 2 hours, the acid number had fallen below 5, and so the temperature was cooled to approximately 100° C., and 203 g of (meth)acrylic anhydride [product name: MAAH, manufactured by Rohm Ltd.] was added dropwise with due care given to heat generation. Subsequently, 0.8 g of tris-dimethylaminophenol was added, and the temperature was raised to 110° C. When the mixture was reacted for 6 hours at 110° C., the acid number fell below 5, and so the reaction was halted. Following cooling to a temperature of approximately 80° C., the product was removed from the reaction vessel, thus yielding an unsaturated resin. This resin is referred to below as the unsaturated resin A-4. The unsaturated resin A-4 had a hydroxyl number of 48, an ester number of 225, a double bond equivalent weight of 245, a resin viscosity (in a solution containing 20% of a styrene monomer diluent) of 4,300 mPa·s, an aromatic ring structural unit content of 44%, and a number average molecular weight of 1,300.

Comparative Synthesis Example 2

Production of a Comparative Unsaturated Resin (V-2)

A similar flask to that used in the synthesis example 1 was charged with 380 g of an epoxy resin [product name: Epiclon 850, manufactured by Dainippon Ink and Chemicals, Incorporated, a bisphenol A epoxy resin with an epoxy equivalent weight of 190], and the temperature was raised to 80° C. under a stream of a mixed gas containing a 1:1 ratio of nitrogen and air. Subsequently, 4 g of triphenylphosphine, 17.2 g of methacrylic acid, and 0.33 g of t-butylhydroquinone were added, and then 277.2 g of (meth)acrylic anhydride [product name: MAAH, manufactured by Rohm Ltd.] was added dropwise with due care given to heat generation. Following completion of the dropwise addition, the temperature was raised to 90° C. When the mixture was reacted for 5 hours at 90° C., the acid number fell below 3, and so the reaction was halted. Following cooling to a temperature of approximately 80° C., the product was removed from the reaction vessel, thus yielding an unsaturated resin. This resin is referred to below as the unsaturated resin V-2. The resin V-2 had a hydroxyl number of 17, an ester number of 314, a double bond equivalent weight of 178, a resin viscosity (in a solution containing 20% of a styrene monomer diluent) of 350 mPa·s, an aromatic ring structural unit content of 24%, and a number average molecular weight of 830.

A list of the components used in the following examples, with the exception of the resins obtained in the above synthesis examples 1 through 4, and the comparative synthesis examples 1 and 2, is provided below.

Styrene monomer: hereafter referred to as monomer B-1.

Tertiary butylperoxyisopropyl carbonate [product name: BIC-75, manufactured by Kayaku Akzo Corporation]: referred to as initiator C-1.

p-benzoquinone [product name: p-BQ, manufactured by Eastman Chemical Company]: hereafter referred to as inhibitor-1.

Zinc stearate: hereafter referred to as mold release agent-1.

Calcium carbonate [product name: MM-100D, manufactured by Maruo Calcium Co., Ltd., average particle size: 3 μm: referred to as filler D-1.

Glass chopped strands [product name: CS6PA-473S, manufactured by Nitto Boseki Co., Ltd., fiber length: 6 mm]: hereafter referred to as reinforcing material D-2.

Examples 3 and 4

Preparation of Molding Materials and Molded Products

Using the unsaturated resins A-3 and A-4 produced in the synthesis examples 3 and 4, and the other blend components described above, the components shown in the Table 2 were blended together in the quantities shown, together with 0.002 parts of the inhibitor-1 and 1 part of the mold release agent-1, and each of the resulting mixtures was mixed thoroughly at room temperature using a kneader, thus yielding a molding material. This molding material was packaged tightly inside a styrene impermeable multilayer film, and was then stored at room temperature. Two days after preparation, the molding material was removed from the multilayer film, filled a flat sheet molding die, and molded with a compression molding device, under conditions including a pressure of 180 kgf/cm² (gauge pressure), an upper mold temperature of 150° C., a lower mold temperature of 145° C., and a molding time of 10 minutes, thereby producing a plate-shaped product with a width of 30 cm, a length of 30 cm, and a thickness of 2.8 mm. This plate-shaped product was evaluated for flexural strength, heat distortion temperature, and hot water resistance. The results of these evaluations are shown in Table 3.

Comparative Examples 2 and 3

With the exception of replacing the unsaturated resins A-3 and A-4 used in the examples 3 and 4 with the unsaturated resins V-1 and V-2 produced in the comparative synthesis examples 1 and 2, molding materials and molded products of the comparative examples 2 and 3 were produced in the same manner as the examples. The blend quantities used are shown in Table 2. The results of the evaluations are shown in Table 3.

TABLE 2

| | | Examples | | Comparative examples | |
|---|---|---|---|---|---|
| Item | | 3 | 4 | 2 | 3 |
| Blend quantity (parts) | Unsaturated resin (A) | A-3 | A-4 | V-1 | V-2 |
| | | 15.5 | 15.5 | 15.5 | 15.5 |
| | Hydroxyl number | 61 | 48 | 198 | 17 |
| | Ester number | 251 | 225 | 196 | 314 |
| | Double bond equivalent weight | 238 | 245 | 283 | 178 |
| | Monomer (B) | | | | |
| | Monomer B-1 | 6.5 | 6.5 | 6.5 | 6.5 |
| | Initiator (C) | | | | |
| | Initiator C-1 | 0.33 | 0.33 | 0.33 | 0.33 |
| | Reinforcing agent, filler (D) | | | | |
| | Filler D-1 | 66.5 | 66.5 | 66.5 | 66.5 |
| | Reinforcing agent D-2 | 10.2 | 10.2 | 10.2 | 10.2 |

TABLE 3

| | Examples | | Comparative examples | |
|---|---|---|---|---|
| Item | 3 | 4 | 2 | 3 |
| Flowability during molding | | | | |
| Plate-shaped product | 3 | 3 | 3 | 3 |
| Molded product external appearance | | | | |
| Filling characteristics | Good | Good | Good | Poor |
| Warping | No | No | No | No |
| Cracking | No | No | No | No |
| Internal state | Good | Good | Good | Good |
| Flexural strength (MPa) | 83 | 85 | 88 | 78 |
| Heat distortion temperature (° C.) | >300 | >300 | >300 | >300 |
| How water resistance (110° C. × 200 hours) | | | | |
| Strength retention rate | 4 | 4 | 4 | 3 |
| Weight reduction ratio (%) | 0.28 | 0.25 | 0.55 | 0.59 |

TABLE 3-continued

| | Examples | | Comparative examples | |
|---|---|---|---|---|
| Item | 3 | 4 | 2 | 3 |
| External appearance | | | | |
| Gloss | Good | Good | Poor | Good |
| Blistering | No | No | No | Yes |

As is evident from the results shown in Table 3, the materials of the examples 3 and 4 exhibit excellent moldability, enable the production of high quality molded products, and also exhibit high levels of heat resistance and hot water resistance. Accordingly, materials that are ideal as household equipment members and electrical members can be provided. In contrast, it is also evident from the results shown in Table 3 that although the materials of the comparative examples 2 and 3 exhibit favorable moldability, the resulting molded products either suffered from low heat resistance, poor hot water resistance, or external appearance problems after the hot water test. Furthermore, the weight reduction ratios also tended to be higher.

Next, synthesis examples are presented for unsaturated resins (A) that can be used as fuel cell separators, together with examples of preparing molding materials, and evaluation results for these molding materials.

The measurement methods and evaluation criteria used within these examples are the same as those described above, although the evaluation methods for additional test items are described below.

[Evaluation of Handling Properties of Conductive Molding Materials]

When each of the conductive molding materials obtained in the following examples was removed from the multilayer film used for storage of the material, the releasability of the material from the film, and the level of stickiness of the resin surface were evaluated visually. The results were classified into two levels.

Poor: the releasability from the film was poor, and the stickiness of the resin composition surface was considerable.

Good: the releasability from the film was good, and the resin composition surface was not sticky.

[Evaluation of Flowability During Molding for Conductive Molding Materials]

Each of the conductive molding materials obtained in the following examples was molded using a 50t transfer molding apparatus, under conditions including a pressure of 150 kgf/cm² (gauge pressure), a piston speed of 1 mm/second, and a temperature of 150° C. The cross-sectional dimensions of the molded product were 7×2 (mm). The spiral flow length of the cured product at this point was measured, and the result was classified into one of the following four levels.

1: at least 0 cm, but less than 20 cm.
2: at least 20 cm, but less than 40 cm.
3: at least 40 cm, but less than 80 cm.
4: at least 80 cm.

In order to achieve favorable mold filling characteristics and obtain a dense molded product with no voids, a result of 3: at least 40 cm, but less than 80 cm is preferred for the above evaluation. An evaluation result of 1: less than 20 cm indicates poor filling characteristics, whereas an evaluation result of 4: at least 80 cm may indicate it is difficult to obtain a dense molded product.

[Evaluation of External Appearance of Molded Products]

With the exception of using the fuel cell separators obtained in the examples described below as the test specimens, evaluation was conducted in the same manner as the tests described above.

[Measurement of Conductivity of the Molded Products]

Test specimens with a width of 1 cm, thickness of 3 mm, and length of 10 cm were cut from the plate-shaped products obtained in the following examples, and the volumetric resistivity of each test specimen was measured in accordance with JIS C-2525.

[Measurement of Flexural Strength of Molded Products], [Measurement of Heat Distortion Temperature of Molded Products], and [Evaluation of Hot Water Resistance of Molded Products (Strength retention test method)] were each conducted in the same manner as described above. However, in the evaluation of the hot water resistance, the previous test conditions of 110° C.×200 hours were altered to 150° C.×240 hours.

Synthesis Example 5

Production of an Unsaturated Resin (A-5)

A similar flask to that used in the synthesis example 1 was charged with 520 g of an epoxy resin [product name: Epiclon HP-7200, manufactured by Dainippon Ink and Chemicals, Incorporated, a dicyclopentadiene phenol novolac epoxy resin with an epoxy equivalent weight of 260], and the resin was stirred while the temperature was raised to 90° C. Subsequently, 86 g of methacrylic acid, 0.4 g of t-butylhydroquinone, and 0.8 g of tris-dimethylaminophenol were added at 90° C., and the temperature of the mixture was then raised to 105° C. under a stream of a mixed gas containing a 1:1 ratio of nitrogen and air. Following raising of the temperature to 105° C. and subsequent reaction for 2 hours, the acid number had fallen below 5, and so the temperature was cooled to approximately 100° C., and 142 g of (meth)acrylic anhydride [product name: MAAH, manufactured by Roehm Ltd.] was added dropwise with due care given to heat generation. Subsequently, 0.7 g of tris-dimethylaminophenol was added, and the temperature was raised to 110° C. When the mixture was reacted for 6 hours at 110° C., the acid number fell below 5, and so the reaction was halted. Following cooling to a temperature of approximately 80° C., the product was removed from the reaction vessel, thus yielding an unsaturated resin (A). This resin is referred to below as the unsaturated resin A-5. The unsaturated resin A-5 had a hydroxyl number of 80, an ester number of 215, a double bond equivalent weight of 258, a resin viscosity (in a solution containing 20% of a styrene monomer diluent) of 5,200 mPa·s, an aromatic and aliphatic ring structural unit content of 40%, and a number average molecular weight of 900.

Synthesis Example 6

Production of an Unsaturated Resin (A-6)

A similar flask to that used in the synthesis example 1 was charged with 548 g of an epoxy resin [product name: NC-3000, manufactured by Nippon Kayaku Co., Ltd., a biphenyl group-containing phenol novolac epoxy resin with an epoxy equivalent weight of 274], and the resin was stirred while the temperature was raised to 90° C. Subsequently, 79 g of methacrylic acid, 0.4 g of t-butylhydroquinone, and 0.8 g of tris-dimethylaminophenol were added at 90° C., and the temperature of the mixture was then raised to 105° C. under a stream of a mixed gas containing a 1:1 ratio of nitrogen and air. Following raising of the temperature to 105° C. and subsequent reaction for 2 hours, the acid number had fallen below 5, and so the temperature was cooled to approximately 100° C., and 160 g of (meth)acrylic anhydride [product name: MAAH, manufactured by Rohm Ltd.] was added dropwise with due care given to heat generation. Subsequently, 0.7 g of tris-dimethylaminophenol was added, and the temperature was raised to 110° C. When the mixture was reacted for 6 hours at 110° C., the acid number fell below 5, and so the reaction was halted. Following cooling to a temperature of approximately 80° C., the product was removed from the reaction vessel, thus yielding an unsaturated resin (A). This resin is referred to below as the unsaturated resin A-6. The unsaturated resin A-6 had a hydroxyl number of 71, an ester number of 211, a double bond equivalent weight of 263, a resin viscosity (in a solution containing 20% of a styrene monomer diluent) of 5,000 mPa·s, an aromatic ring structural unit content of 45%, and a number average molecular weight of 1,390.

Synthesis Example 7

Production of an Unsaturated Resin (A-7)

A similar flask to that used in the synthesis example 1 was charged with 578 g of an epoxy resin [product name: NC-3000H, manufactured by Nippon Kayaku Co., Ltd., a biphenyl group-containing phenol novolac epoxy resin with an epoxy equivalent weight of 289], and the resin was stirred while the temperature was raised to 90° C. Subsequently, 48 g of methacrylic acid, 0.4 g of t-butylhydroquinone, and 0.8 g of tris-dimethylaminophenol were added at 90° C., and the temperature of the mixture was then raised to 105° C. under a stream of a mixed gas containing a 1:1 ratio of nitrogen and air. Following raising of the temperature to 105° C. and subsequent reaction for 1 hour, the acid number had fallen below 5, and so the temperature was cooled to approximately 100° C., and 215 g of (meth)acrylic anhydride [product name: MAAH, manufactured by Rohm Ltd.] was added dropwise with due care given to heat generation. Subsequently, 0.8 g of tris-dimethylaminophenol was added, and the temperature was raised to 110° C. When the mixture was reacted for 7 hours at 110° C., the acid number fell below 5, and so the reaction was halted. Following cooling to a temperature of approximately 80° C., the product was removed from the reaction vessel, thus yielding an unsaturated resin (A). This resin is referred to below as the unsaturated resin A-7. The unsaturated resin A-7 had a hydroxyl number of 40, an ester number of 221, a double bond equivalent weight of 250, a resin viscosity (in a solution containing 20% of a styrene monomer diluent) of 12,600 mPa·s, an aromatic ring structural unit content of 46%, and a number average molecular weight of 1,770.

Comparative Synthesis Example 3

Production of a Comparative Unsaturated Resin (V-3)

A similar flask to that used in the synthesis example 1 was charged with 520 g of an epoxy resin [product name: Epiclon HP-7200, manufactured by Dainippon Ink and Chemicals, Incorporated, a dicyclopentadiene phenol novolac epoxy resin with an epoxy equivalent weight of 260], 168 g of methacrylic acid, and 0.29 g of t-butylhydroquinone, and the temperature was raised to 90° C. under a stream of a mixed gas containing a 1:1 ratio of nitrogen and air. Subsequently, 1.5 g of tris-dimethylaminophenol was added, and when the temperature of the mixture was raised to 110° C. and reaction was conducted for 10 hours, the acid number fell below 5, and so the reaction was halted. Following cooling to a temperature of approximately 80° C., the product was removed from the reaction vessel, thus yielding an unsaturated resin. This resin is referred to below as the unsaturated resin V-3. The unsaturated resin V-3 had a hydroxyl number of 162, an ester number of 153, a double bond equivalent weight of 352, a resin viscosity (in a solution containing 20% of a styrene monomer diluent) of 8,600 mPa·s, an aromatic and aliphatic ring structural unit content of 44%, and a number average molecular weight of 870.

A list of the components used in the following examples, with the exception of the resins obtained in the above synthesis examples 5 through 7, and the comparative synthesis examples 1 and 3, and the raw materials used in the above molding material examples 3 and 4, is provided below.

Divinylbenzene [product name: DVB-810, manufactured by Nippon Steel Chemical Co., Ltd., purity: 81%]: hereafter referred to as monomer B-2.

Modified liquid compound of diphenylmethane diisocyanate [product name: Isonate 143LJ, manufactured by Dow Polyurethane Japan Ltd., NCO: 29%]: hereafter referred to as thickener (polyisocyanate) E-1.

Polystyrene resin [product name: Dicstyrene CR-2500, manufactured by Dainippon Ink and Chemicals, Incorporated, molecular weight: 200,000]: hereafter referred to as low profile additive-1.

Compatibilizing-agent [product name: RS-900, manufactured by Dainippon Ink and Chemicals, Incorporated]: hereafter referred to as compatibilizing-agent-1.

Perfluoropolyether [product name: Fluorolink D10-H, manufactured by Solvay Solexis Inc., molecular weight: 1,500]: hereafter referred to as mold release agent-2.

Synthetic graphite [product name: K-100, manufactured by Applied Carbon Technology, Inc., average particle size: 300 μm hereafter referred to as filler D-3.

Examples 5 to 8

Preparation of Conductive Molding Materials and Molded Products

Using the unsaturated resins A-5, A-6, and A-7 produced in the synthesis examples 5 to 7, and the other blend components such as B-1, B-2, C-1, D-3, and E-1 described above, the components shown in the Table 4 were blended together in the quantities shown, together with 0.01 parts of the inhibitor-1 and 0.2 parts of the mold release agent-2, and each of the resulting mixtures was mixed thoroughly at room temperature using a kneader, thus yielding a curable resin composition, and a conductive molding material. This molding material was packaged tightly inside a styrene monomer impermeable multilayer film. Following thickening for 2 days at 30° C., the conductive molding material was returned to room temperature and stored. Three days after preparation, the molding material was removed from the aforementioned multilayer film, filled a fuel cell separator-shaped molding die and a flat sheet molding die, and molded with a compression molding device, under conditions including a pressure of 150 kgf/cm² (gauge pressure), an upper mold temperature of 150° C., a lower mold temperature of 145° C., and a molding time of 10 minutes, thereby producing a fuel cell separator with a width of 13 cm, a length of 20 cm, and a thickness of 3 mm, and a plate-shaped product. The handling properties of the resin composition were evaluated. The fuel cell separator was evaluated for external appearance, and the plate-shaped product was evaluated for conductivity, flexural strength, heat distortion temperature, and hot water resistance. The results of these evaluations are shown in Table 6.

Comparative Examples 4 to 6

Preparation of Comparative Molding Materials and Molded Products

With the exception of replacing the unsaturated resins (A) used in the examples 5 through 8 with the unsaturated resins V-1 and V-3 prepared in the comparative synthesis examples 1 and 3, conductive molding materials and molded products were produced in the same manner as the examples 5 to 8. In these cases, the blend quantity of the total resin component was adjusted to ensure that the added quantity of the conductive filler within each of the molding materials was the same. The blend quantities are shown in Table 5. The results of the evaluations are shown in Table 7.

TABLE 4

| | | Examples | | | |
|---|---|---|---|---|---|
| | Item | 5 | 6 | 7 | 8 |
| Blend quantity (parts) | Unsaturated resin (A) | A-3 | A-4 | A-4 | A-5 |
| | | 13.0 | 13.2 | 12.9 | 13.5 |
| | Hydroxyl number | 80 | 71 | 71 | 40 |
| | Ester number | 215 | 211 | 211 | 221 |
| | Double bond equivalent weight | 258 | 263 | 263 | 250 |
| | Monomer (B) | | | | |
| | Monomer B-2 | 2.9 | 2.9 | 2.9 | 3.0 |
| | Monomer B-1 | 5.8 | 5.9 | 5.7 | 5.9 |
| | Initiator (C) C-1 | 0.2 | 0.2 | 0.2 | 0.2 |
| | Filler (D) D-3 | 75 | 75 | 75 | 75 |
| | Thickener (E) E-1 | 2.9 | 2.6 | 2.4 | 1.5 |
| | Low profile additive-1 | 0 | 0 | 0.6 | 0.6 |
| | Compatibilizing-agent-1 | 0 | 0 | 0.1 | 0.1 |
| | Polyisocyanate OH/NCO ratio | 1.0/1.07 | 1.0/1.07 | 1.0/1.01 | 1.0/1.07 |

TABLE 5

| | | Comparative examples | | |
|---|---|---|---|---|
| | Item | 4 | 5 | 6 |
| Blend quantity (parts) | Unsaturated resin (A) | V-1 | V-3 | V-3 |
| | | 11.7 | 12.1 | 14.8 |
| | Hydroxyl number | 198 | 162 | 162 |
| | Ester number | 196 | 153 | 153 |
| | Double bond equivalent weight | 283 | 352 | 352 |
| | Monomer (B) | | | |
| | Monomer B-2 | 2.6 | 2.7 | 2.9 |
| | Monomer B-1 | 5.1 | 5.4 | 6.9 |
| | Initiator (C) | | | |
| | Initiator C-1 | 0.2 | 0.2 | 0.2 |
| | Filler (D) D-3 | 75 | 75 | 75 |
| | Thickener (E) E-1 | 5.2 | 4.4 | 0 |
| | Low profile additive-1 | 0 | 0 | 0 |
| | Compatibilizing-agent-1 | 0 | 0 | 0 |
| | Polyisocyanate OH/NCO ratio | 1.0/0.88 | 1.0/0.88 | 1.0/0.0 |

TABLE 6

| Item | Examples | | | |
|---|---|---|---|---|
| | 5 | 6 | 7 | 8 |
| Handling properties | Good | Good | Good | Good |
| Flowability during molding | | | | |
| 3 days after production | 3 | 3 | 3 | 3 |
| 15 days after production | 3 | 3 | 3 | 3 |
| Molded product external appearance | | | | |
| Filling characteristics | Good | Good | Good | Good |
| Warping | No | No | No | No |
| Cracking | No | No | No | No |
| Internal state | Good | Good | Good | Good |
| Conductivity | | | | |
| Volumetric resistivity (mΩ · cm) | 5 | 6 | 6 | 4 |
| Flexural strength (MPa) | 33 | 36 | 35 | 33 |
| Heat distortion temperature (° C.) | 285 | >300 | >300 | >300 |
| How water resistance (150° C. × 240 hours) | | | | |
| Strength retention rate | 4 | 4 | 4 | 4 |
| Weight reduction ratio (%) | 0.38 | 0.35 | 0.33 | 0.29 |

TABLE 7

| Item | Comparative examples | | |
|---|---|---|---|
| | 4 | 5 | 6 |
| Handling properties | Good | Good | Poor |
| Flowability during molding | | | |
| 3 days after production | 3 | 1 | 4 |
| 15 days after production | 2 | 1 | 4 |
| Molded product external appearance | | | |
| Filling characteristics | Poor | Poor | Good |
| Warping | Yes | Yes | No |
| Cracking | No | Yes | No |
| Internal state | Good | Good | Many voids |
| Conductivity | | | |
| Volumetric resistivity (mΩ · cm) | 12 | 27 | 4 |
| Flexural strength (MPa) | 38 | 36 | 30 |
| Heat distortion temperature (° C.) | 235 | 274 | 192 |
| How water resistance (150° C. × 240 hours) | | | |
| Strength retention rate | 2 | 3 | 1 |
| Weight reduction ratio (%) | 2.2 | 1.5 | 2.8 |

As is evident from the results shown in Table 6, the materials of the examples 5 to 8 exhibit excellent moldability, enable the production of high quality molded products, and also exhibit high levels of heat resistance and hot water resistance. Accordingly, materials that are ideal as separator materials for fuel cells can be provided. In contrast, it is also evident from the results shown in Table 7 that the materials of the comparative examples 4 to 6 exhibit poor moldability, and the resulting molded products suffer significant defects, meaning their practical applicability is poor. Furthermore, the hot water resistance values also tended to be lower. The weight reduction ratios also tended to be higher, indicating a larger quantity of eluted material, and making the products unsuitable as separator materials.

INDUSTRIAL APPLICABILITY

A curable resin composition according to the present invention, when used as a molding material, exhibits excellent flowability during molding and excellent handling properties, suffers no moldability problems during molding such as the occurrence of filling inconsistencies, voids, warping, or cracking, and enables the provision of a molded product with excellent transferability from the molding die, and superior dimensional precision. Furthermore, a molded product obtained by curing a curable resin composition according to the present invention exhibits excellent external appearance, and excellent levels of water absorption resistance, hot water resistance, and mechanical strength, as well as particularly superior durability such as water resistance. Accordingly, a molded product obtained by curing a curable resin composition of the present invention is extremely useful, not only for household equipment members, but also for electronic and electrical members, vehicle members, and fuel cell separators used under severe conditions.

The invention claimed is:

1. A curable resin composition comprising,
    an unsaturated resin (A) having a methacryloyl group, the unsaturated resin (A) being a solid resin at ordinary temperatures produced by reacting at least one of a dicyclopentadiene-based novolac epoxy resin and a biphenyl-based novolac epoxy resin with only methacrylic anhydride or with only methacrylic acid and methacrylic anhydride, the unsaturated resin (A) having a double bond equivalent weight of 210 to 400, an ester number of 100 to 300, and a hydroxyl number of no more than 130;
    an ethylenically unsaturated monomer (B) selected from a group consisting of styrene, t-butylstyrene, vinylnaphthalene, vinylbiphenyl, pentafluorostyrene, vinylpyrene, vinylthiophene, vinylcarbazole, divinylbenzene, divinylnaphthalene, divinylbiphenyl, dicyclopentenyl methacrylate, dicyclopentenyloxyethyl methacrylate, dicyclopentanyl methacrylate, adamantane methacrylate, 1,10-dodecanediol dimethacrylate, cyclohexanedimethanol dimethacrylate, and tricyclodecanedimethanol dimethacrylate; and
    a radical polymerization initiator (C);
    wherein the viscosity of resin (A), which is solid at ordinary temperatures, can be measured when dissolved in the ethylenically unsaturated monomer (B), with the viscosity preferably being in a range of 500 to 15,000 mPa·s at 25° C.

2. The curable resin composition according to claim 1, wherein a number average molecular weight of said unsaturated resin (A) is from 900 to 5,000.

3. The curable resin composition according to claim 1, wherein a sum of a hydroxyl number and an ester number of said unsaturated resin (A) is from 120 to 320.

4. The curable resin composition according to claim 1, wherein a hydroxyl number of said unsaturated resin (A) is from 20 to 130.

5. The curable resin composition according to claim 1, wherein said unsaturated resin comprises from 20 to 80% by mass of aromatic ring structural units and/or aliphatic alicyclic ring structural units.

6. A molding material, comprising a curable resin composition according to claim 1, and further comprising a reinforcing agent and/or a filler (D).

7. A fuel cell separator produced by molding a molding material according to claim 6.

8. A molding material for producing a fuel cell separator, comprising a curable resin composition according to claim 1, and further comprising a conductive carbon-based material and a polyisocyanate compound.

9. The curable resin composition according to claim 1, wherein the viscosity of resin (A), dissolved in the ethylenically unsaturated monomer (B), is in a range of 500 to 15,000 mPa·s at 25° C.

10. The curable resin composition according to claim 1, wherein the viscosity of resin (A), dissolved in the ethylenically unsaturated monomer (B), is in a range of 500 to 15,000 mPa·s at 25° C. in a mixed solution containing 80% by mass of the unsaturated resin (A) and 20% by mass of ethylenically unsaturated monomer (B).

11. A curable resin composition comprising,
an unsaturated resin (A) having a methacryloyl group, the unsaturated resin (A) being a solid resin at ordinary temperatures produced by reacting a biphenyl-based novolac epoxy resin with only methacrylic anhydride or with only methacrylic acid and methacrylic anhydride, the unsaturated resin (A) having a double bond equivalent weight of 210 to 400, an ester number of 100 to 300, and a hydroxyl number of no more than 130;
an ethylenically unsaturated monomer (B); and
a radical polymerization initiator (C);
wherein the viscosity of resin (A), which is solid at ordinary temperatures, can be measured when dissolved in the ethylenically unsaturated monomer (B), with the viscosity preferably being in a range of 500 to 15,000 mPa·s at 25° C.

* * * * *